(12) United States Patent
Chan et al.

(10) Patent No.: US 10,691,218 B2
(45) Date of Patent: Jun. 23, 2020

(54) GESTURE RECOGNITION APPARATUS AND COMPONENTS THEREOF

(71) Applicant: City University of Hong Kong, Kowloon (HK)

(72) Inventors: Ho Man Chan, Kowloon (HK); Nabeel Siddiqui, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 9 days.

(21) Appl. No.: 15/609,147

(22) Filed: May 31, 2017

(65) Prior Publication Data

US 2018/0348877 A1 Dec. 6, 2018

(51) Int. Cl.
| | | |
|---|---|---|
| *G06F 3/01* | (2006.01) | |
| *H04R 1/02* | (2006.01) | |
| *H04R 19/04* | (2006.01) | |
| *H04R 19/01* | (2006.01) | |
| *H04R 17/02* | (2006.01) | |
| *G06F 1/16* | (2006.01) | |

(52) U.S. Cl.
CPC .............. *G06F 3/017* (2013.01); *G06F 1/163* (2013.01); *H04R 1/028* (2013.01); *H04R 17/02* (2013.01); *H04R 19/01* (2013.01); *H04R 19/016* (2013.01); *H04R 19/04* (2013.01); *H04R 2420/07* (2013.01)

(58) Field of Classification Search
CPC ......... G06F 3/017; G06F 1/163; H04R 1/028; H04R 17/02; H04R 19/01; H04R 19/04
See application file for complete search history.

(56) References Cited

U.S. PATENT DOCUMENTS

| | | | | |
|---|---|---|---|---|
| 7,411,866 B1* | 8/2008 | Hu | ............ | G06F 3/011 367/135 |
| 2014/0139454 A1* | 5/2014 | Mistry | ............ | G06F 3/041 345/173 |
| 2015/0035743 A1 | 2/2015 | Rosener | | |

FOREIGN PATENT DOCUMENTS

WO 2016089442 A1 5/2015

OTHER PUBLICATIONS

S. S. Rautaray and A. Agrawal, "Vision based hand gesture recognition for human computer interaction: a survey", Artif. Intell. Rev., vol. 43, pp. 1-54, Jan. 2015.
J. Han et al, "Enhanced Computer Vision with Microsoft Kinect Sensor: A Review", IEEE Transactions on Cybernetics, vol. 43, pp. 1318-1334, Oct. 2013.
L. Dipietro, A. M. Sabatini and P. Dario, "A survey of glove-based systems and their applications", IEEE Transactions on Systems Man and Cybernetics Part C—Applications and Reviews, vol. 38, pp. 461-482, Jul. 2008.

(Continued)

*Primary Examiner* — Wing H Chow
(74) *Attorney, Agent, or Firm* — Renner Kenner Greive Bobak Taylor & Weber

(57) ABSTRACT

A gesture recognition apparatus includes a sensor unit configured to be worn by a user on a user's body part. The sensor unit includes one or more sensors, a processor unit, the processor unit and the sensor unit are arranged in communication with each other, the processor unit receiving acoustic data from the one or more sensors, wherein the acoustic data corresponds to a gesture performed by a user, and the processor unit is configured to process the acoustic data received from the one or more sensors to determine a gesture performed by the user.

26 Claims, 5 Drawing Sheets

(56) References Cited

OTHER PUBLICATIONS

B. Peerdeman et al, "Myoelectric forearm prostheses: State of the art from a user-centered perspective", Journal of Rehabilitation Research and Development, vol. 48, pp. 719-737, 2011.

C. Savur and F. Sahin, "Real-time American sign language recognition system using surface EMG signal," in 2015 IEEE 14th International Conference on Machine Learning and Applications (ICMLA), 2015, pp. 497-502.

J. Galka et al, "Inertial Motion Sensing Glove for Sign Language Gesture Acquisition and Recognition", IEEE Sensors Journal, vol. 16, pp. 6310-6316, 2016.

S. Wang et al, "Interacting with Soli: Exploring Fine-Grained Dynamic Gesture Recognition in the Radio-Frequency Spectrum", UIST 2016: Proceedings of the 29th Annual Symposium on User Interface Software and Technology, pp. 851-860, 2016.

S. Faye, R. Frank and T. Engel, "Adaptive activity and context recognition using multimodal sensors in smart devices", in Mobile Computing, Applications, and Services: 7th International Conference, MobiCASE 2015, Berlin, Germany, Nov. 13, 2015, Revised Selected Papers, S. Sigg, P. Nurmi and F. Salim, Eds. Cham: Springer International Publishing, 2015, pp. 33-50.

L. Ardüser et al, "Recognizing text using motion data from a smartwatch", in 2016 IEEE International Conference on Pervasive Computing and Communication Workshops (PerCom Workshops), 2016, pp. 1-6.

C. Xu, P. H. Pathak and P. Mohapatra, "Finger-writing with smartwatch: A case for finger and hand gesture recognition using smartwatch", In Proceedings of the 16th International Workshop on Mobile Computing Systems and Applications, Santa Fe, New Mexico, USA, 2015, pp. 9-14.

T. Yu, H. Jin and K. Nahrstedt, "WritingHacker: Audio based eavesdropping of handwriting via mobile devices", in Proceedings of the 2016 ACM International Joint Conference on Pervasive and Ubiquitous Computing, Heidelberg, Germany, 2016, pp. 463-473.

G. Laput, R. Xiao and C. Harrison, "ViBand: High-fidelity bio-acoustic sensing using commodity smartwatch accelerometers", in Proceedings of the 29th Annual Symposium on User Interface Software and Technology, Tokyo, Japan, 2016, pp. 321-333.

Y. Zhang and C. Harrison, "Tomo: Wearable, low-cost electrical impedance tomography for hand gesture recognition", in Proceedings of the 28th Annual ACM Symposium on User Interface Software & Technology, Daegu, Kyungpook, Republic of Korea, 2015, pp. 167-173.

S. Viegas et al, "Wrist Anatomy—Incidence, Distribution, and Correlation of Anatomic Variations, Tears, and Arthrosis", Journal of Hand Surgery-American Volume, vol. 18A, pp. 463-475, May 1993.

C. Orizio, "Muscle Sound—Bases for the Introduction of a Mechanomyographic Signal in Muscle Studies", Crit. Rev. Biomed. Eng., vol. 21, pp. 201-243, 1993.

O. Al-Jarrah and A. Halawani, "Recognition of gestures in Arabic sign language using neuro-fuzzy systems", Artif. Intell., vol. 133, pp. 117-138, Dec. 2001.

S. Hesse, H. Schmidt, C. Werner and A. Bardeleben, "Upper and lower extremity robotic devices for rehabilitation and for studying motor control". Current opinion in neurology 16 (6): 705-10. 2003.

\* cited by examiner

GESTURE RECOGNITION APPARATUS AND COMPONENTS THEREOF

TECHNICAL FIELD

The present disclosure relates to a gesture recognition apparatus, components thereof and a method of gesture recognition. In particular the present disclosure is related to a gesture recognition apparatus, method and components thereof configured for gesture recognition based on movements of a person's body part.

BACKGROUND

Humans use their fingers to mediate the majority of mechanical interactions between themselves and the world. Hand gestures are used a communication protocol between multiple people. Sign language is common example of the use of hand gestures for communication. Various approaches utilize hand gestures for human computer interface applications. One well established approach tracks the finger motions by vision based systems. These vision based systems require the hand to be within certain field of view. Other popular class of devices utilizes mechanical sensors to capture finger kinematics and identify gestures based on finger kinematics. These kinematic sensors were often mounted on a glove that was worn by a user. The use of gloves can be inconvenient for users to wear throughout the day and in some instances such gloves can be intrusive and reduce tactile perception of a user. Radar based systems are also under development for use in determining hand motions or gestures.

SUMMARY OF THE INVENTION

It is an object of the present invention to provide a gesture recognition apparatus and components thereof that ameliorate one or more of the disadvantages of some of the known prior art or at least provide the public with a useful alternative.

The gesture recognition apparatus, components thereof and gesture recognition method will be described hereinafter with reference to the accompanying figures. However it will be appreciated that the embodiments described in present disclosure may not be limited to this particular field of use and also can be used for analysis of muscles in hand rehabilitation, sign language to speech or motor prosthesis.

In accordance with a first aspect the present disclosure provides a gesture recognition apparatus comprising:
a sensor unit configured to be worn by a user on a user's body part,
the sensor unit comprising one or more sensors,
a processor unit, the processor unit and the sensor unit are arranged in communication with each other,
the processor unit receiving acoustic data from the one or more sensors, wherein the acoustic data corresponds to a gesture performed by a user, and
the processor unit configured to process the acoustic data received from the one or more sensors to determine a gesture performed by the user.

In an embodiment at least one sensor of the one or more sensors is an acoustic sensor.

In an embodiment each sensor of the one or more sensors is an acoustic sensor.

In an embodiment each sensor of the one or more sensors is a microphone.

In an embodiment each sensor of the one or more sensors is a bottom ported MEMS microphone.

In an embodiment each sensor of the one or more sensors is an electret microphone or a piezoelectric microphone.

In an embodiment each sensor of the one or more sensors is arranged, in use, to be in contact with a body part of the user.

In an embodiment the sensor unit comprising a retaining member configured to retain the sensor unit on a body part of a user, the one or more sensors are positioned on the retaining member and in contact with a body part of the user.

In an embodiment the retaining member comprises a strap, and in use the strap being wrapped around a body part of the user to retain the sensor unit on the body part and the one or more sensors in direct skin contact with the body part.

In an embodiment the body part is a user's wrist, and; in use, the sensor unit is disposed on the wrist of the user such that the one or more sensors are arranged in direct skin contact with a portion of the user's wrist.

In an embodiment at least one sensor of the one or more sensors is positioned on the retaining member such that, in use, the at least one sensor is situated in the middle of the user' wrist.

In an embodiment the sensor unit comprises a plurality of sensors, a first sensor of the plurality of sensors arranged on the retaining member such that in use the first sensor is positioned on or adjacent a user's posterior wrist and a second sensor of the plurality of sensors arranged on the retaining member such that in use the second sensor is positioned on or adjacent a user's anterior wrist.

In an embodiment each sensor of the one or more sensors is arranged to maximize a signal to noise ratio.

In an embodiment the sensor unit comprises five sensors, each sensor of the five sensors being spaced apart from each other.

In an embodiment the sensor unit comprise three anterior sensors that are arranged such that, in use, the three anterior sensors are positioned on or adjacent the anterior wrist of a user and; the sensor unit further comprises a plurality of posterior sensors that are arranged such that, in use, the plurality of posterior sensors are positioned on or adjacent the posterior wrist of a user.

In an embodiment each sensor of the sensor unit are equally spaced apart from each other.

In an embodiment the sensor unit comprises a central anterior sensor arranged such that in use the central anterior sensor is positioned at the center of the anterior wrist of a user, the sensor unit comprises a left anterior sensor and a right anterior sensor wherein the left anterior sensor and the right anterior sensor are arranged such that, in use, the left anterior sensor is arranged left of the central anterior sensor and the right anterior sensor is arranged right of the central anterior sensor.

In an embodiment the left anterior sensor and the right anterior sensor are equally spaced from the central anterior sensor.

In an embodiment the two posterior sensors are arranged such that, in use, the two posterior sensors become located on either side of the center of the posterior wrist of a user, and the two posterior sensors are equally spaced from the center of the posterior wrist of a user.

In an embodiment each sensor of the five sensors is spaced apart from the other sensors at a spacing distance and the spacing distance is determined such that a signal to noise ratio for each sensor is maximized.

In an embodiment the sensor unit comprises one or more amplifiers located on the sensor unit, the one or more amplifiers are arranged in electronic communication with the one or more sensors on the sensor unit and wherein the one or more amplifiers are configured to amplify acoustic signals measured by the one or more sensors.

In an embodiment the processor unit comprises an analysis module, the analysis module configured to identify one or more features from the acoustic data and determining one or more gestures based on the identified one or more features.

In an embodiment wherein the processor unit further comprises a memory unit, the memory unit includes a relationship between one or more gestures and one or more features of acoustic data, and wherein the analysis module being configured to determine one or more gestures based on the stored relationship between one or more gestures and one or more features of acoustic data.

In an embodiment the apparatus further comprises a user interface, the user interface is configured to communicate the one or more determined gestures to a user or another person.

In an embodiment the user interface is a visual interface and the user interface visually communicating the one or more determined gestures.

In an embodiment the apparatus is configured to identify and display hand gestures of a user.

In an embodiment the apparatus is configured to use in the assessment of muscular, ligaments, tendons and bones function.

In accordance with a second aspect of the present invention provides a wearable device for use with or as part of a gesture recognition apparatus or system, the wearable device comprising:
a sensor unit configured to be worn by a user on a user's body part, the sensor unit comprising one or more sensors, the one or more sensors configured to measure acoustic data corresponding to movement of the body part,
the one or more sensors arranged in electronic communication with a processor and providing the acoustic data to the processor for processing to determine a gesture performed by the user based on the acoustic data.

In an embodiment each sensor of the one or more sensors is an acoustic sensor.

In an embodiment each sensor of the one or more sensors is a microphone, wherein the microphone measuring acoustic data related to movement of the body part.

In an embodiment each sensor of the one or more sensors is a bottom ported MEMS microphone.

In an embodiment each sensor of the one or more sensors is an electret microphone or a piezoelectric microphone.

In an embodiment each sensor of the one or more sensors is arranged, in use, to be in contact with a body part of the user.

In an embodiment the sensor unit comprises a retaining member configured to retain the sensor unit on a body part of a user, and; the one or more sensors are positioned on the retaining member and in contact with a body part of the user.

In an embodiment the retaining member comprises a strap, and in use the strap being wrapped around a body part of the user to retain the sensor unit on the body part and the one or more sensors in direct skin contact with the body part.

In an embodiment the body part is a user's wrist, and in use, the sensor unit is disposed on the wrist of the user such that the one or more sensors are arranged in direct skin contact with a portion of the user's wrist.

In an embodiment at least one sensor of the one or more sensors is positioned on the retaining member such that, in use, the at least one sensor is situated in the middle of the user' wrist.

In an embodiment the sensor unit comprises a plurality of sensors, a first sensor of the plurality of sensors arranged on the retaining member such that in use the first sensor is positioned on or adjacent a user's posterior wrist and a second sensor of the plurality of sensors arranged on the retaining member such that in use the second sensor is positioned on or adjacent a user's anterior wrist.

In an embodiment the sensor unit comprises five sensors, each sensor of the five sensors being spaced apart from each other.

In an embodiment the sensor unit comprise three anterior sensors that are arranged such that, in use, the three anterior sensors are positioned on or adjacent the anterior wrist of a user and; In an embodiment, the sensor unit further comprises two posterior sensors that are arranged such that, in use, the two posterior sensors are positioned on or adjacent the posterior wrist of a user.

In an embodiment the sensor unit comprises a central anterior sensor arranged such that in use the central anterior sensor is positioned at the center of the anterior wrist of a user, the sensor unit comprises a left anterior sensor and a right anterior sensor wherein the left anterior sensor and the right anterior sensor are arranged such that, in use, the left anterior sensor is arranged left of the central anterior sensor and the right anterior sensor is arranged right of the central anterior sensor.

In an embodiment the left anterior sensor and the right anterior sensor are equally spaced from the central anterior sensor.

In this specification, the word "comprising" and its variations, such as "comprises", has its usual meaning in accordance with International patent practice. That is, the word does not preclude additional or unrecited elements, substances or method steps, in addition to those specifically recited. Thus, the described apparatus, substance or method may have other elements, substances or steps in various embodiments of the invention. The purpose of the claims is to define the features which make up the invention and not necessarily all features which a working embodiment of the apparatus, substance or method, to which the invention defines, may have. The apparatus, substance or method defined in the claims may therefore include other elements, steps or substances as well as the inventive elements, steps or substances which make up the invention and which are specifically recited in the claims.

BRIEF DESCRIPTION OF THE DRAWINGS

Embodiments of the gesture recognition apparatus, components thereof and a gesture recognition method will now be described, by way of example, with reference to the accompanying drawings in which.

DETAILED DESCRIPTION OF A PREFERRED EMBODIMENT

Figure 1:
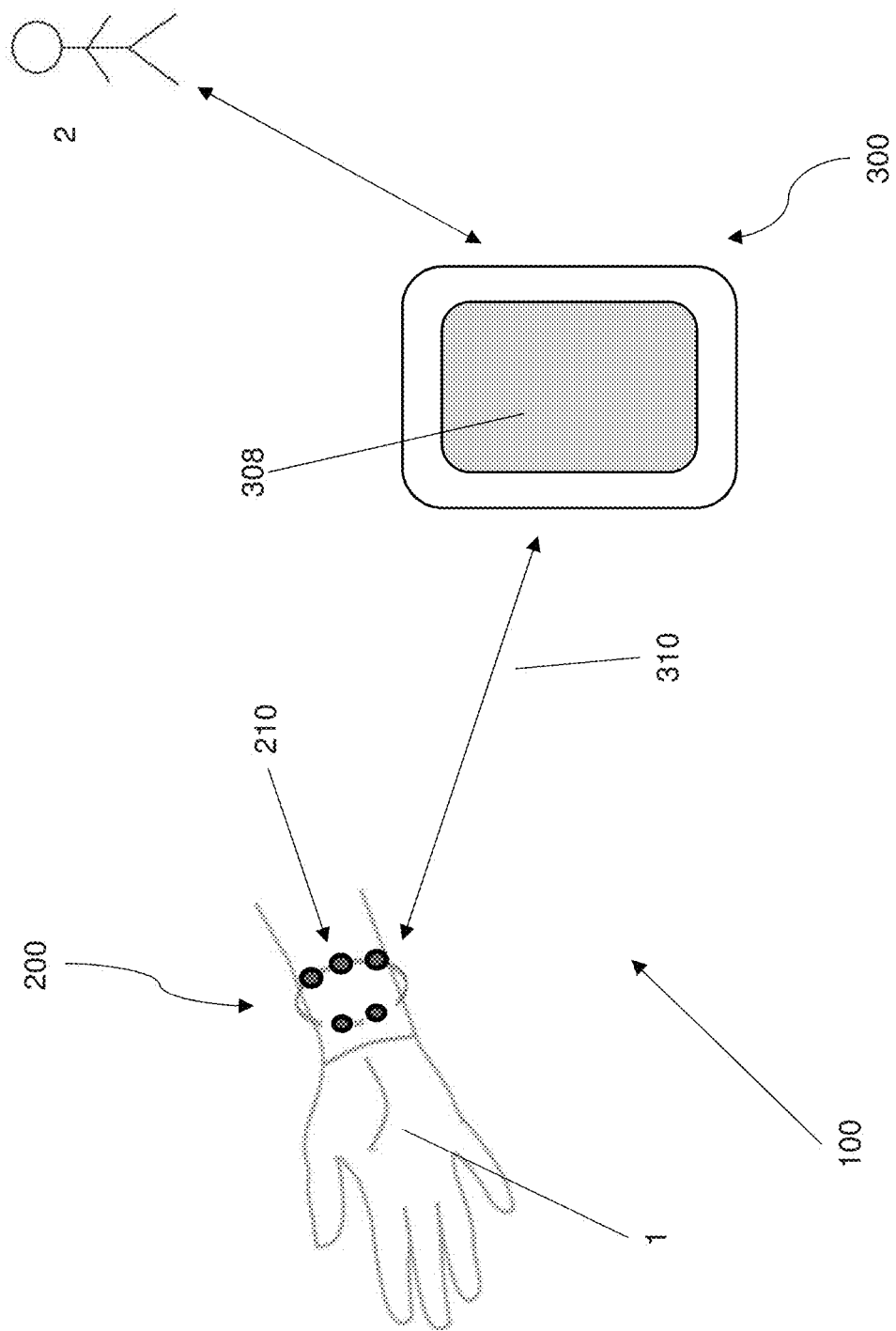
FIG. 1 shows an embodiment of a gesture recognition apparatus including a wearable device.

In general terms the present disclosure relates to a gesture recognition apparatus, components thereof (such as a wearable device) and a method of gesture recognition. The method of gesture recognition can be implemented using the gesture recognition apparatus. In particular the present disclosure is related to a gesture recognition apparatus, method and components thereof configured for gesture recognition based on movements of a person's body part. such as an arm, leg, wrist, hand, foot, head, neck or any other suitable body part or limb.

The present disclosure generally relates to a gesture recognition apparatus comprising; a sensor unit configured to be worn by a user on a user's body part, the sensor unit comprising one or more sensors, a processor unit, the processor unit and the wearable unit in communication with each other, the processor unit receiving acoustic data from the one or more sensors, wherein the acoustic data corresponds to a gesture performed by a user, and the processor configured to process the acoustic data received from the one or more sensors to determine a gesture performed by the user.

Generally the disclosure further relates to a wearable device for use with a gesture recognition apparatus or system comprises; a sensor unit configured to be worn by a user on a user's body part, the sensor unit comprising one or more sensors, the one or more sensors configured to measure acoustic data corresponding to movement of the body part, the one or more sensors arranged in electronic communication with a processor and providing the acoustic data to the processor for processing to determine a gesture performed by the user based on the acoustic data.

The gesture recognition apparatus, components thereof (such as the wearable device) and method of gesture recognition have a number of practical applications and uses. The gesture recognition apparatus and components thereof (such as the wearable device) can be used for data acquisition related to motion data of a user's body part. The gesture recognition apparatus and components thereof can also be used to determine and communicate gestures performed by a user to another person for interpersonal communication, such as helping with sign language communication. Further the gesture recognition apparatus and components thereof can be used in sign language to speech conversion protocols or devices or products, motor prosthesis to help disabled persons, and for body part rehabilitation training or services. Other applications and uses are also contemplated.

Body part as referred to within the present disclosure means any limb of a user such as an arm, leg, wrist, hand, foot, head, neck or any other suitable moveable body part. The gesture recognition apparatus and components thereof are used to determine movement of a body part and thus determine a gesture based on the measured movement. The present disclosure will be described with respect to hand movements and in particular wrist movements but movements of other body parts are contemplated. A gesture as described herein means movement of a part a body part to express an idea or meaning. The present disclosure will be described with respect to gestures that are performed by a user's hand and in particular a user's wrist, however the gesture recognition apparatus and components thereof can be used for gesture recognition of other body parts.

In an embodiment the gesture recognition apparatus comprises a sensor unit configured to be worn by a user on a user's body part, the sensor unit comprising one or more sensors, a processor unit, the processor unit and the sensor unit are arranged in communication with each other, the processor unit receiving acoustic data from the one or more sensors, wherein the acoustic data corresponds to a gesture performed by a user, and the processor configured to process the acoustic data received from the one or more sensors to determine a gesture performed by the user. In this embodiment each sensor of the one or more sensors is an acoustic sensor. Alternatively at least one sensor of the one or more sensors is an acoustic sensor and the other sensors can be any other suitable sensors such as gyroscopes or accelerometers or surface wave acoustic sensor, bioacoustics sensor or any other suitable sensor. Preferably the sensors are acoustic sensors that generate an acoustic signal that corresponds to a gesture (also known as a motion) of a body part. Preferably the one or more sensors are arranged in contact with the body part of the user.

In this embodiment the sensor unit comprises a retaining member configured to retain the sensor unit on the body part of the users and the one or more sensors are positioned on the retaining member. The retaining member can be any suitable retaining member such as a strap or glove or ring or bracelet or an article of clothing. In an embodiment the body part is a user's hand, more specifically a wrist of a user. The one or more sensors are positioned on the retaining member such that, in use, the at least one sensor is situated in the middle of the user's wrist. The sensor unit comprises a plurality of sensors, a first sensor of the plurality of sensors arranged on the retaining member such that in use the first sensor is positioned on or adjacent a user's posterior wrist and a second sensor of the plurality of sensors arranged on the retaining member such that in use the second sensor is positioned on or adjacent a user's anterior wrist. Each sensor of the one or more sensors is arranged to maximize a signal to noise ratio of acoustic data (i.e. signals) produced by the sensor.

In an embodiment there is provided a wearable device for use with or as part of a gesture recognition apparatus. The wearable device is configured to be worn by a user and facilitate gesture recognition by a suitable processor. In this embodiment the wearable device comprises a sensor unit and a retaining member. The sensor unit comprises a plurality of sensors. The sensors may be any suitable sensors used for detecting movements or gestures performed by a user, such as for example acoustic sensors or gyroscopes or accelerometers etc. The retaining member is configured to retain the sensor unit on a body part of the user. The retaining member can be any suitable retaining member such as a strap or glove or ring or bracelet or an article of clothing. In an embodiment the body part is a user's hand, more specifically a wrist of a user. Each sensor of the one or more sensors is arranged to maximize a signal to noise ratio of acoustic data (i.e. signals) produced by the sensor FIG. 1 shows an exemplary embodiment of a gesture recognition apparatus 100. The gesture recognition apparatus 100 comprises a wearable device 200 that is part of the gesture recognition apparatus. The wearable device 200 is adapted to be worn by a user on a user's body part in use. The wearable device 200 is configured for use with or as part of the gesture recognition apparatus 100.

The wearable device 200 and the gesture recognition apparatus 100 comprises a sensor unit 210 and processor unit 300. The sensor unit 210 is configured to be worn by a user on a user's body part. The sensor unit 210 comprises one or more sensors that produce acoustic data. The acoustic data corresponds to a gesture performed by a user. The processor unit 300 and the sensor unit 210 are arranged in communication with each other. The processor unit 300 and the sensor unit 210 are in electronic communication with each other to transmit information.

FIG. 1 shows a communication link 310 between the sensor unit 210 and the processor unit 300. The communication link 310 may be a wired or wireless connection. Preferably the communication link 310 is a wireless communication link such as Bluetooth or Wi-Fi or Infrared or any other suitable wireless communication link. Alternatively the sensor unit 210 may be electrically connected to the processor unit 300 via one or more conductors or a PCB.

The processor unit 300 receives acoustic data (also known as acoustic signals) from the one or more sensors of the sensor unit 210. The acoustic data from the one or more sensors corresponds to a gesture performed by a user. The processor unit 300 is configured to process the acoustic data received from the one or more sensors to determine a gesture performed by the user. The processor unit 300 is further configured to communicate the determined gesture to another person or another device such as a computer or a. The processor unit 300 can visually or audibly or electrically communicate identified gestures to another person or another device.

As shown in FIG. 1 the processor unit 300 is configured to interface with (i.e. communicate with) the user 1 or another person 2. The user 1 as shown in FIG. 1 is a person that wears the wearable device 200. However the term user can encompass any person that uses the gesture recognition apparatus including the other person 2. For ease of explanation, the user and other person are separate persons in this disclosure. The other person 2 may also use the gesture recognition apparatus 100. The other person 2 may be a friend, colleague, clinician, or any other suitable person. Preferably the processor unit 300 visually and/or audibly communicates the determined gestures so that the other person 2 can understand the gesture. The gesture recognition apparatus 100 as shown in FIG. 1 is used as a communication system i.e. a sign language to speech communication apparatus. The apparatus 100 is used to determine a gesture performed by a user's hand 1 and then communicate the gesture as speech to the other person 2.

In alternative embodiments the processor unit 300 can communicate the determined gestures and/or the acoustic data to any other apparatus or system for further use. For example the processor unit 300 may transmit the determined gestures and/or the acoustic data relating to movement of the body parts to a rehabilitation system that can determine a rehabilitation plan for the user. One example can be the use of the acoustic data in hand rehabilitation. Alternative example uses could be for motor prosthesis or for apparatuses or systems that may require hand gesture recognition such gaming systems or materials handling equipment. The illustrated apparatus 100, in FIG. 1, can act as a sign language to speech apparatus wherein the gestures performed by a user 1 are identified based on processing the acoustic data and then converted to speech that is communicated visually and/or audibly to another person.

Figure 2:
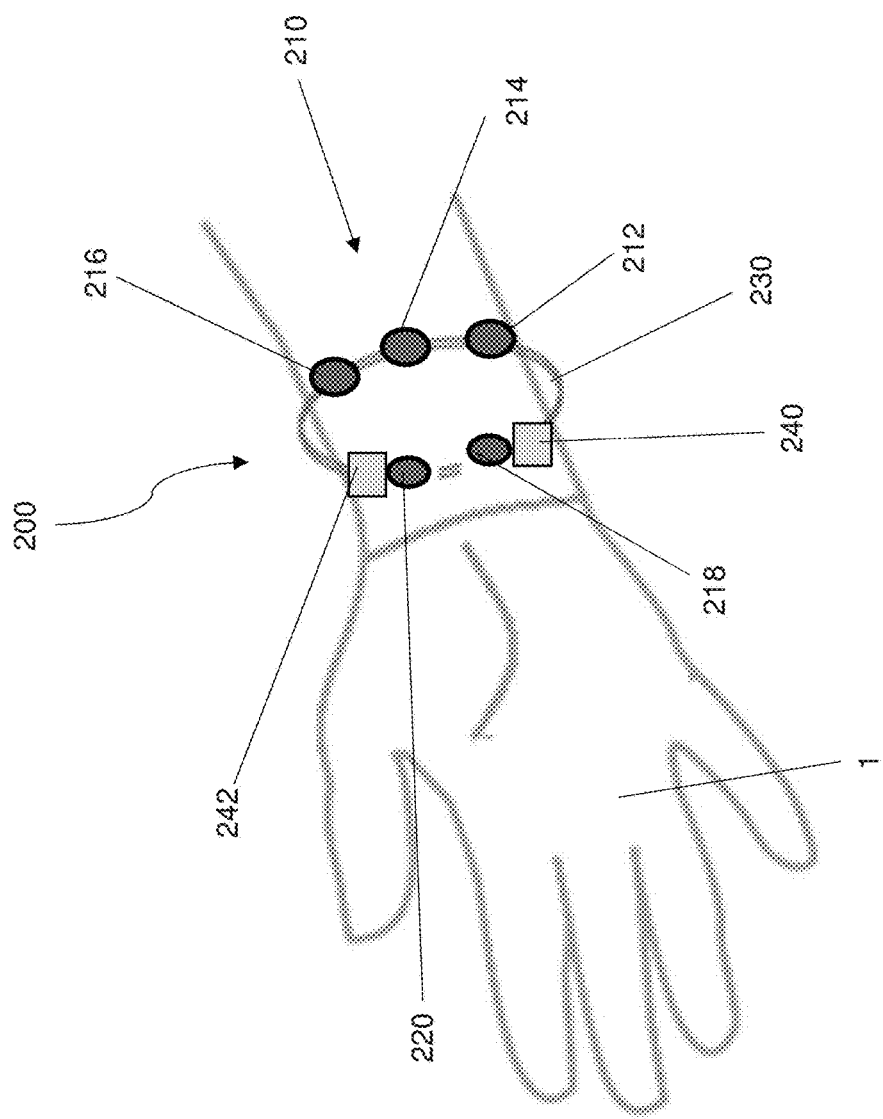
FIG. 2 shows a view of the wearable device being attached to a user's hand and an exemplary location of one or more sensors on a user's hand.

The wearable device 200 will be described in more detail with reference to FIG. 2. FIG. 2 shows an exemplary embodiment of the wearable device 200 that can be used with or as part of the gesture recognition apparatus 100. The wearable device 200 as described with reference to FIG. 2 is preferably part of the gesture recognition apparatus 100. However in alternate embodiments the wearable device 200 can be used with or as part of any other suitable gesture or motion recognition system.

Referring to FIG. 2 the wearable device 200 comprises a sensor unit 210. The sensor unit 210 comprises a plurality of sensors 212, 214, 216, 218, 220 (also written as 212-220). One or all of the plurality of sensors may be acoustic sensors. In the illustrated embodiment wearable device 200 comprises five sensors 212-220. Preferably all five sensors are acoustic sensors. Preferably each sensor 212-220 is a microphone. In the illustrated embodiment each sensor is a bottom ported MEMS microphones, such as for example ADMP401 by Analog Devices. The microphones have a typical sensitivity of −42 dBV. Alternatively the each sensor may be an electret microphone or a piezoelectric microphone. Other microphone types or other acoustic sensors are also contemplated.

Each sensor 212-220 is arranged, in use, to be in contact with a body part of the user. The sensors 212-220, when in use, are in direct contact with the skin of a user and records acoustic activities generated by anatomical elements in the body part such as bones, tendons, ligaments, muscular movement as the user 1 performs gestures. In the illustrated embodiment the user's hand is illustrated and the sensors 212-220 are in direct skin contact with the wrist of the user's hand. The sensors 212-220 generate acoustic data corresponding to movements of a user's wrist and/or hand. In particular the sensors 212-220 are configured to detect a sound of anatomical elements within the user's hand and/or wrist during various gestures.

Referring to FIG. 2 the sensor unit 210 comprises a retaining member 230. The retaining member 230 is configured to retain the sensor unit 210 on the wrist of the user 1. The retaining member 230 may be configured or shaped to retain the sensor unit 210 on any other body part. The one or more sensors 212-220 are positioned on the retaining member and arranged, in use, to be in contact with the wrist of the user 1. The retaining member 230 comprises a strap 232. In use the strap 232 are wrapped around the wrist of the user to retain the sensor unit 210 on the wrist such that the sensors 212-220 are in direct skin contact with the wrist of the user. In alternative embodiments the retaining member 230 may be shaped or configured to mount the sensor unit 210 on another body part such as the foot, neck, fingers, arm or any other limb of a user.

The sensors 212-220 are arranged in a predefined configuration on the retaining member 230. In the illustrated embodiment at least one sensor of the plurality of sensors 212-220 is positioned on the retaining member such that, in use when the wearable device 210 is mounted on the wrist, the at least one sensor is situated in the middle of the user's wrist. Some of the sensors of the sensor unit 210 are arranged to align with or be located on an anterior wrist and other sensors are arranged to align with or be located on a posterior wrist of the user. As shown in the illustrated embodiment the sensor unit 210 comprises three anterior sensors 212, 214 and 216. The anterior sensors 212-216 are arranged such that, in use the three sensors are positioned on or adjacent an anterior wrist of the patient. The sensor unit 210 further comprises two posterior sensors 218, 220. The posterior sensors 218-220 are arranged such that, in use, the posterior sensors are positioned on or adjacent the posterior wrist of a user.

The sensor unit 210 comprises a central anterior sensor 214 as shown in FIG. 1. The central anterior sensor is arranged such that in use the central anterior sensor is positioned at the center of the anterior wrist of a user. The sensor unit 210 further comprises a left anterior sensor 212 and a right anterior sensor 216, wherein the left anterior sensor is arranged left of the central anterior sensor 214 and the right anterior sensor 216 is arranged right of the central anterior sensor 214. In one arrangement the five sensors 212-220 may be equally spaced from each other when positioned on the retaining member 230. Preferably the left anterior sensor 212 and the right anterior sensor 216 are equally spaced from the central anterior sensor 214. The two posterior sensors 218, 220 are arranged such that, in use, the two posterior sensors 218, 220 may be located on either side of the center of the posterior wrist of the user, although there is flexibility as to where the sensors 218, 220 can be placed. The two posterior sensors 218, 220 are equally spaced from the center of the posterior wrist of the user.

The sensors 212-220 are removably mounted on the retaining member 230 such that each sensor can be removed. The sensors 212-220 can be moved around the retaining member 230 such that the desired spacing of the sensors is achieved for varying sizes of user's wrists. The retaining member 230, in use, is wrapped adjacent the wrist and is spaced between 1 cm and 4 cm from the wrist line of the user. Preferably the retaining member 230 is spaced 2 cm from the wrist line of the user. The inter sensor spacing i.e. spacing between each sensor can be customized for each user depending on the size of the user's wrist. The removable device 200 comprises at least one sensor that is located in the center of the anterior wrist. Each sensor 212-220 is spaced apart from the other sensors at a spacing distance and the spacing distance is determined such that a signal to noise ratio for each sensor is maximized.

The sensor unit 210 comprises one or more amplifiers located on the sensor unit and wherein the one or more amplifiers are configured to amplify acoustic signals measured by the one or more sensors. In the illustrated embodiment shown in FIG. 2, the sensor unit comprises a pair of amplifiers 240, 242. The amplifiers 240, 242 are arranged in electronic communication with one or more the sensors 212-220. The amplifiers 240, 242 can be any suitable amplifiers and are configured to amplify the sensor acoustic signals (i.e. acoustic data) with a gain of up to 67 dB. In alternative embodiments the sensor unit 210 can comprise an amplifier associated with each sensor 212-220. The sensors 212-220 further comprise communication circuitry or the sensor unit 210 comprises communication circuitry that allows wireless communication between the sensor unit 210 and the processing unit 300.

Figure 3:
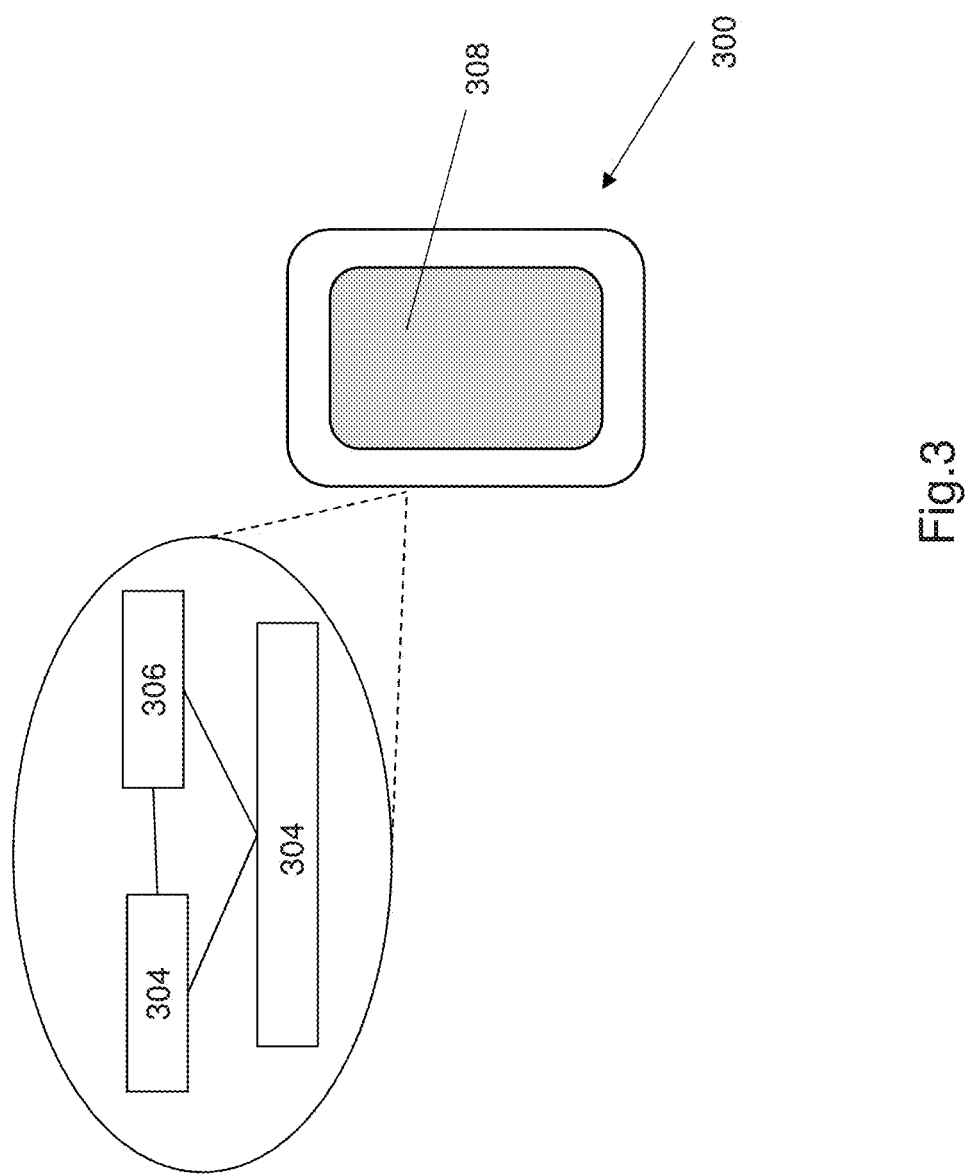
FIG. 3 shows a block diagram of processor unit that forms part of the gesture recognition apparatus.

FIG. 3 shows an exemplary embodiment of the processing unit 300 and its components. FIG. 3 is a block diagram showing the components of the processing unit 300. The processing unit 300 comprises a memory unit 302, an analysis module 304, a communications module 306 and a user interface 308. The communications module 306 acts as an interfacing module that allows two way communication between the sensor unit 210 and the processing unit 300. Alternatively the communications module 306 allows one way communication i.e. a read out from the sensor unit 210 to the processing unit. The communications module 306 comprises a communication IC such as for example a Bluetooth module, infrared module or Wi-Fi module that allows wireless communication between the sensor unit 210 and the processing unit 300. The communication module 306 further other interfacing circuitry such as smoothing circuits, amplifiers and filters. The interfacing circuitry allows for some pre-processing of the received acoustic data such that the analysis module 302 can further process the acoustic data and determine a gesture.

Figure 4:
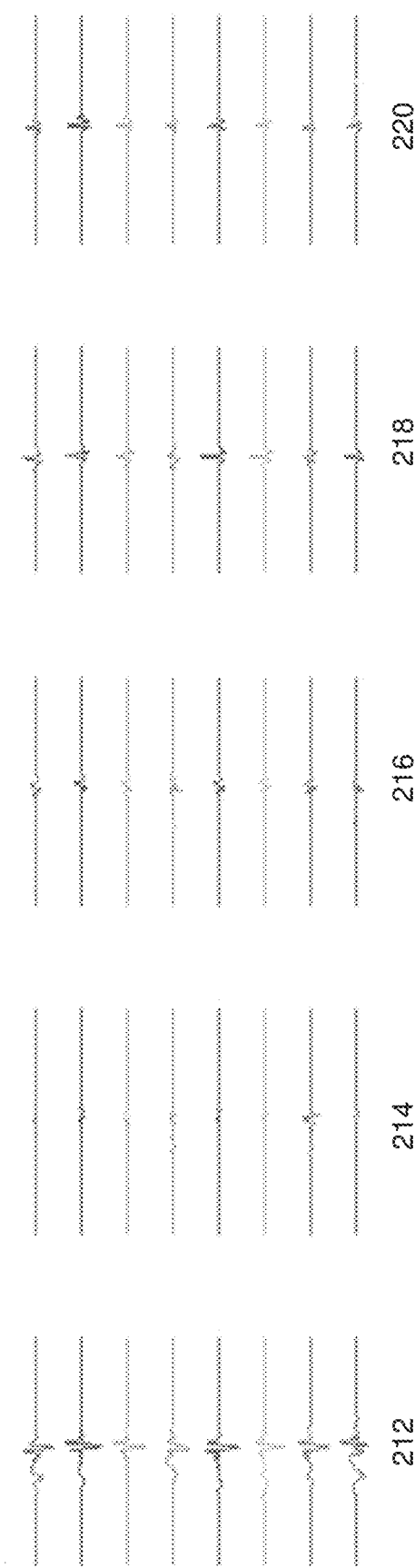
FIG. 4 shows examples of acoustic data signals from the sensors of the gesture recognition apparatus; and, FIG. 5 shows an embodiment of a method of gesture recognition.

The memory unit 304 is in electronic communication with the analysis module 302 and the communications module 306. The memory unit 304 is configured to store acoustic data received from the sensor unit 210 via the communication module 306. The memory unit 304 further comprises a set of computer readable instructions that can be executed by the analysis module 302, the computer readable instructions causes the analysis module 302 to perform analysis on the acoustic data to determine a gesture. The analysis module 302 is an electronic module comprising at least a microprocessor and other electronic circuitry. The analysis module 302 is configured to identify one or more features from the received acoustic data. FIG. 4 shows examples of 8 measurements of acoustic data, from the five sensors 212-220. FIG. 4 shows readings related to an open hand gesture. The acoustic data is preferably voltages produced by the sensors that relate to a sound or acoustic signal detected by the sensor, and wherein each acoustic signal relates to the sound created by an anatomical element in the users body part (e.g. a wrist or hand) as the user performs a gesture. The acoustic signals are 12 bit amplified audio signals. As shown in FIG. 4, the sensor left anterior sensor 212 produces the largest signal during a hand open gesture. The other sensors 214-220 are also shown. The acoustic signals are shown as small spikes of voltage. The amplitude of the spikes are proportional to or related to the "loudness" of the movement of the anatomical elements. The analysis module 302 comprises a sampler or sampling circuitry. The analysis module 302 is configured to sample the sensor data at a sampling frequency of 1 kHz. Other sampling frequencies or sampling rates are also contemplated.

The analysis module 302 is configured to check the received acoustic data and identify one or more features from the acoustic data and determining one or more gestures based on the identified one or more features. The analysis module 302 being configured to determine one or more gestures based on the stored relationship between one or more gestures and one or more features of acoustic data. The relationship between a gesture and a feature of the acoustic data is stored in the memory unit 304 and is accessible by the analysis module 302. Some example features can be frequency, maxima, minima, root mean square, mean absolute value, waveform length, variance, log detector, skew kurtosis and absolute standard deviation. Other features can be extracted from the acoustic data.

The relationship between a gesture and acoustic data is predetermined. The relationship can be determined based on measured data in an experimental or lab setting. A large data set can be collected and used as a training data set. The relationship between a gesture and acoustic data can be built up using suitable machine learning algorithms that are executed by the processing unit. A training data set is created based on data collection experiments run during a calibration phase. The data collection experiments comprise performing a known gesture, measuring the acoustic data received and programming a relationship between the received acoustic data and the gesture. The relationship comprises a classification of gestures based on the acoustic data detected when the particular gesture is performed. Large data sets can be created and one or more suitable machine learning algorithms can be used to train the processing unit 300, in particular the analysis module 302 to learn and store the relationship between acoustic data and gestures. The relationship can be derived into a lookup table or an equation or any other appropriate format. The relationship is stored in the memory unit 304 such that when the apparatus 100 is used in the field, a gesture is identified based on the stored relationship.

Experimental testing has been performed with large data sets and various classification techniques were compared. Some examples of classification methods used experimentally are kNN, DT, LDA, and SVM. The results of the classification were cross validated using Monte Carlo Cross Validation (MCCV) method using 100 repetitions. The gesture recognition apparatus 100 performs well enough to identify gestures based on received acoustic data to 80% accuracy.

Preferably acoustic data is received in real time from the sensor unit 210 at the analysis module 302. The analysis module 302 comprises circuitry and a microprocessor that has sufficient processing speed such that the apparatus 100 can identify and display the display and any associated speech/words in real time. Alternatively the acoustic data can be stored in the memory unit 304 and processed later.

The user interface 308, in the illustrated embodiment, is a touch screen. Alternatively the user interface 308 can comprise a screen and a separate keyboard or set of buttons. The user interface 308 is configured to communicate the one or more determined gestures to a user or another person 2. The user interface 308 may visually or audibly or both visually and audibly communicate the gestures or a word related to the gesture to another person 2. In an embodiment the processing unit 300 may be a smartphone, laptop, tablet, PC, computer or any other suitable computing device.

The illustrated embodiments shown in FIG. 1 and FIG. 2 of the gesture recognition apparatus 100 and the associated wearable device 200 facilitate communication. The gesture recognition apparatus 100 facilitates communication between a person using sign language (e.g. a deaf or mute person) and another person 2 who may not know sign language. Other uses of the gesture recognition apparatus 100 and the wearable device 200 are also contemplated such as for assessment of the muscular, ligaments, tendons and bones function during rehabilitation. The apparatus is configured to detect acoustic signals associated with gestures (i.e. movements) performed by a user's body part, for example a hand. The acoustic signals can be processed to determine a gesture and also determine the quality of the gesture. The quality of the gesture can include information relating to the condition of a user's body part such as the health of muscles of the body part. This information can be used for determining the level of rehabilitation or can be used to prescribe further exercises. There are also applications in motor prosthesis and control of prosthesis using gestures. Further there are applications in sports science to assess the quality of movements or efficiency of movements. These applications are all predicated on the above disclosure of using a wearable device 200 that measures acoustic signals corresponding to gestures or movements performed by a user's body part.

In an embodiment the apparatus is configured to identify and display hand gestures of a user. In an embodiment the apparatus is configured to use in the assessment of muscular functions.

Figure 5:
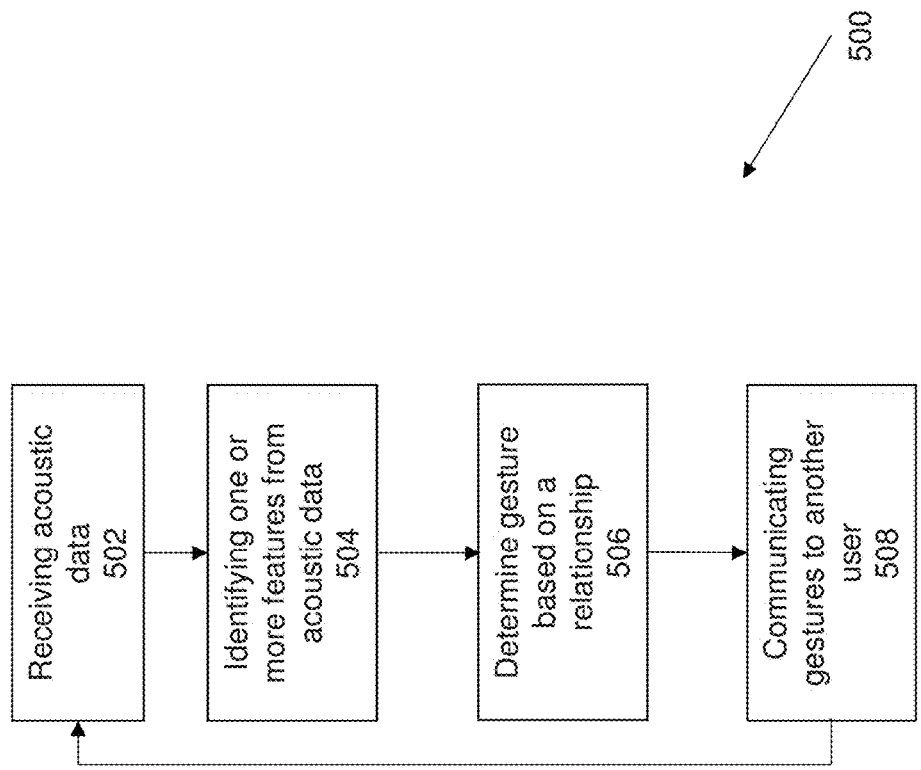

The present disclosure further relates to a method 500 of gesture determination. A method of gesture recognition will be described with respect to FIG. 5. The method 500 of gesture recognition is executed by the gesture recognition apparatus 100, and utilizes components of the gesture recognition apparatus such as the wearable device 200. In an embodiment the method 500 is executed by the processing unit 300. The method of gesture recognition comprises the steps of receiving acoustic data at step 502. The acoustic data relates to a gesture performed by a user of the apparatus 100. The acoustic data relates to sound created by movement of anatomical elements within the hand of the user. Step 504 comprises identifying one or more features from the received acoustic data. The features can be any suitable features in the received data such as for example root mean square, frequency, period, waveform length, variance, log detector, skew kurtosis, median frequency or maxima or absolute standard deviation. The features can be identified using any suitable mathematical processes. Step 506 comprises determining a gesture corresponding to the identified features based on a stored relationship between one or more gestures and one or more features of the acoustic data. The relationship is preferably a predetermined relationship. The relationship can be created or built up using any one or more suitable machine learning algorithms. Step 508 comprises communicating one or more determined gestures to another person. The gestures are communicated visually or audibly or both visually and audibly to another person. The method 500 as described can be executed by the processor unit. In one embodiment the method 500 is stored as a set of executable instructions that are stored in the memory unit 304. The processing unit 300 and the analysis module 302 being configured to execute the stored instructions to perform the method. The method 500 can be repeated multiple times and the method 500 may be executed in real time.

The gesture recognition apparatus 100 and the wearable apparatus 200 as described herein is advantageous because the wearable apparatus 200 is easier to use than other known systems comprising gloves etc. The wearable apparatus 200 is more versatile than some prior art systems. The gesture recognition apparatus 100 is advantageous because it is useable in multiple applications such as sign language to speech conversion or acoustic analysis of muscles for rehabilitation or for improving performance, motor prosthesis control as well as a communication medium.

Although not required, the embodiments described with reference to the Figures can be implemented to file an application programming interface (API) or as a series of libraries for use by a developer or can be included within another software application, such as a terminal or personal computer operating system or a portable computing device operating system. Generally, as program modules include routines, programs, objects, components and data files the skilled person assisting in the performance of particular functions, will understand that the functionality of the software application may be distributed across a number of routines, objects or components to achieve the same functionality.

It will be appreciated by persons skilled in the art that numerous variations and/or modifications may be made to the present invention as shown in the specific embodiments without departing from the spirit or scope of the invention as broadly described. The present embodiments are, therefore, to be considered in all respects as illustrative and not restrictive.

It will also be appreciated that where the methods and systems of the present invention are either wholly implemented by computing system or partly implemented by computing systems then any appropriate computing system architecture may be utilized. This will include stand-alone computers, network computers and dedicated hardware devices. Where the terms "computing system" and "computing device" are used, these terms are intended to cover any appropriate arrangement of computer hardware capable of implementing the function described.

The terminology used herein is for the purpose of describing particular embodiments only and is not intended to be limiting of the invention. As used herein, the singular forms "a," "an" and "the" are intended to include plural forms as well, unless the context clearly indicates otherwise. It will be further understood that the terms "comprises" or "comprising," when used in this specification, specify the presence of stated features, integers, steps, operations, elements components and/or groups or combinations thereof, but do not preclude the presence or addition of one or more other features, integers, steps, operations, elements, components and/or groups or combinations thereof.

As used herein, the term "and/or" includes any and all possible combinations or one or more of the associated listed items, as well as the lack of combinations when interpreted in the alternative ("or").

Any reference to prior art contained herein is not to be taken as an admission that the information is common general knowledge, unless otherwise indicated. It is to be understood that, if any prior art information is referred to herein, such reference does not constitute an admission that the information forms a part of the common general knowledge in the art, any other country.

The invention claimed is:

1. A gesture recognition apparatus comprising:
    a sensor unit configured to be worn by a user on a wrist of the user,
        the sensor unit comprising:
            a retaining member configured to retain the sensor unit on the wrist of the user, and
            a plurality of acoustic sensors spaced apart from each other, arranged on the retaining member, and arranged to record sound generated by bones, tendons, ligaments, or muscles within the wrist or a hand corresponding to the wrist as the user performs a gesture using the wrist or the corresponding hand, the plurality of acoustic sensors including:
                three anterior acoustic sensors arranged such that, in use, the three anterior acoustic sensors are positioned on or adjacent an anterior of the wrist of the user, the three anterior acoustic sensors include:
                    a central anterior acoustic sensor arranged such that, in use, the central anterior acoustic sensor is positioned at the center of the anterior wrist of the user, and
                    a left anterior acoustic sensor and a right anterior acoustic sensor arranged such that, in use, the left anterior acoustic sensor is arranged to the left of the central anterior acoustic sensor and the right anterior acoustic sensor is arranged right of the central anterior acoustic sensor; and
    a processor unit arranged in electronic communication with the sensor unit, the processor unit configured to:
        receive acoustic data from plurality of acoustic sensors, wherein the acoustic data corresponds to the recorded sound, and
        process the acoustic data received from the plurality of acoustic sensors to:
            identify one or more features from the acoustic data, and
            determine a gesture performed by the user based on the one or more identified features.

2. The gesture recognition apparatus in accordance with claim 1, wherein each of the plurality of acoustic sensors are a microphone.

3. The gesture recognition apparatus in accordance with claim 2, wherein the microphones is a bottom ported MEMS microphone.

4. The gesture recognition apparatus in accordance with claim 2, wherein the microphone is an electret microphone or a piezoelectric microphone.

5. The gesture recognition apparatus in accordance with claim 1, wherein the plurality of acoustic sensors are arranged, in use, to be in direct contact with the wrist of the user.

6. The gesture recognition apparatus in accordance with claim 1, wherein the retaining member comprises a strap configured to be wrapped around the wrist of the user.

7. The gesture recognition apparatus in accordance with claim 1, wherein in use, the sensor unit is disposed on the wrist such that the plurality of acoustic sensors are arranged to be in direct skin contact with the wrist.

8. The gesture recognition apparatus in accordance with claim 1, wherein each of the plurality of acoustic sensors is arranged to maximize a signal to noise ratio.

9. The gesture recognition apparatus in accordance with claim 1, wherein the plurality of acoustic sensors further comprise:
    two posterior acoustic sensors arranged such that, in use, the two posterior acoustic sensors are positioned on or adjacent the posterior wrist of the user.

10. The gesture recognition apparatus in accordance with claim 9, wherein the three anterior acoustic sensors and the two posterior acoustic sensors are equally spaced apart from each other.

11. The gesture recognition apparatus in accordance with claim 9, wherein the two posterior acoustic sensors are arranged such that, in use, the two posterior acoustic sensors are equally spaced from the center of the posterior wrist of the user.

12. The gesture recognition apparatus in accordance with claim 1, wherein the left anterior acoustic sensor and the right anterior acoustic sensor are equally spaced from the central anterior acoustic sensor.

13. The gesture recognition apparatus in accordance with claim 1, wherein the plurality of acoustic sensors are spaced apart from one another at respective spacing distances, and the respective spacing distances are determined are arranged to maximize a signal to noise ratio for each of the plurality of acoustic sensors.

14. The gesture recognition apparatus in accordance with claim 1, wherein the sensor unit comprises one or more amplifiers arranged in electronic communication with the plurality of acoustic sensors and wherein the one or more amplifiers are configured to amplify the sounds recorded by the plurality of acoustic sensors.

15. The gesture recognition apparatus in accordance with claim 1, wherein the processor unit comprises a memory unit, the memory unit stores information containing a relationship between gestures and respective features of acoustic data, and wherein the processor unit is configured to determine the gestures performed by the user based on the stored information.

16. The gesture recognition apparatus in accordance with claim 1, further comprising a user interface configured to communicate the determined gesture to the user or another person.

17. The gesture recognition apparatus in accordance with claim 16, wherein the user interface is a visual interface for visually communicating the determined gesture.

18. The gesture recognition apparatus in accordance with claim 16, wherein the user interface is an audible interface for audibly communicating the determined gesture.

19. The gesture recognition apparatus in accordance with claim 1, wherein the gesture recognition apparatus is configured to identify and display hand gestures of the user.

20. The gesture recognition apparatus in accordance with claim 1, wherein the gesture recognition apparatus is configured to assess functions of: muscles, ligaments, tendons, bones, or any combination thereof, based on the determined gesture.

21. The gesture recognition apparatus in accordance with claim 1, wherein the one or more features comprises one or more of: frequency, maxima, minima, root mean square, mean absolute value, waveform length, variance, log detector, skew kurtosis and absolute standard deviation.

22. The gesture recognition apparatus in accordance with claim 1, wherein the sensor unit and the processor unit are connected wirelessly to provide the electronic communication between the sensor unit and the processor unit.

23. The gesture recognition apparatus in accordance with claim 1, wherein the sensor unit and the processor unit are connected in a wired manner to provide the electronic communication between the sensor unit and the processor unit.

24. A wearable device for use with or as part of a gesture recognition apparatus or system, the wearable device comprising:
   a sensor unit configured to be worn by a user on a wrist of the user, the sensor unit comprising:
      a retaining member configured to retain the sensor unit on the wrist of the user, and
      a plurality of acoustic sensors spaced apart from each other, arranged on the retaining member and arranged to record sounds generated by bones, tendons, ligaments, or muscles within the wrist or a hand corresponding to the wrist as the user performs a gesture using the wrist or the corresponding hand, the plurality of acoustic sensors including:
         three anterior acoustic sensors arranged such that, in use, the three anterior acoustic sensors are positioned on or adjacent an anterior of the wrist of the user, the three anterior acoustic sensors including:
            a central anterior acoustic sensor arranged such that in use the central anterior acoustic sensor is positioned at the center of the anterior wrist of the user, and
            a left anterior acoustic sensor and a right anterior acoustic sensor arranged such that, in use, the left anterior acoustic sensor is arranged left of the central anterior acoustic sensor and the right anterior acoustic sensor is arranged right of the central anterior acoustic sensor;
   the plurality of acoustic sensors being arranged in electronic communication with a processor and configured to provide the acoustic data corresponding to the recorded sounds to the processor; the processor being configured to:
   receive acoustic data from the plurality of acoustic sensors, wherein the acoustic data corresponds to the recorded sounds, and
   process the acoustic data received from the plurality of acoustic sensors to:
      identify one or more features from the acoustic data, and
      determine a gesture performed by the user based on the one or more identified features.

25. The wearable device in accordance with claim 24, wherein the plurality of acoustic sensors comprise a plurality of microphones.

26. The wearable device in accordance with claim 25, wherein the plurality of microphones are selected from the group consisting of a bottom ported MEMS microphone, an electret microphone, a piezoelectric microphone, or combinations thereof.

* * * * *